Patented July 3, 1951

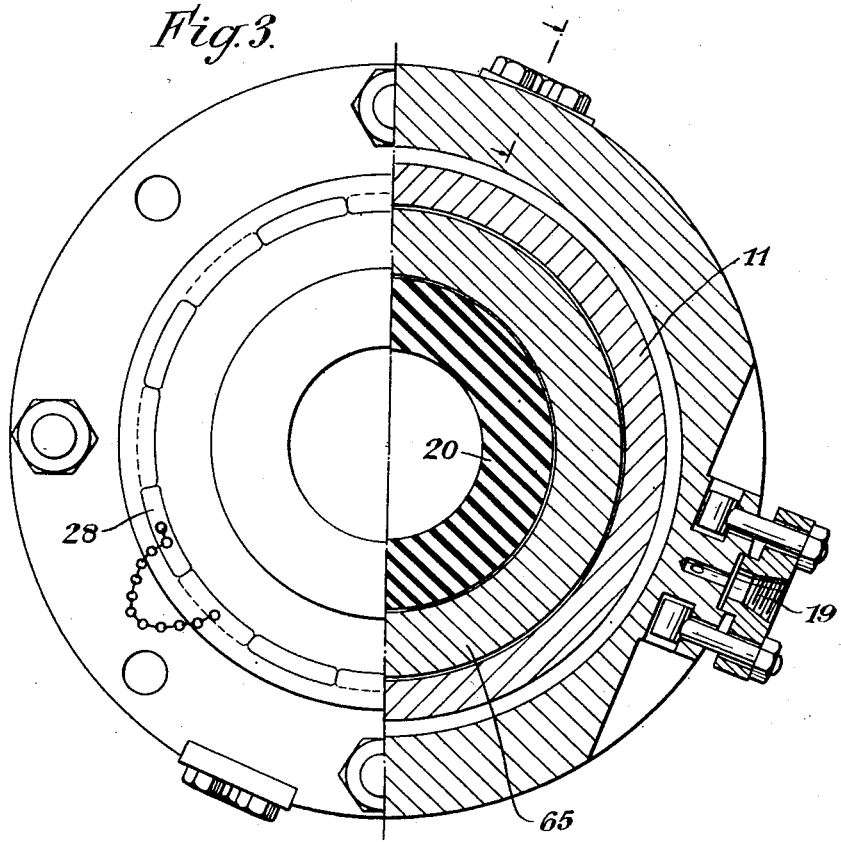
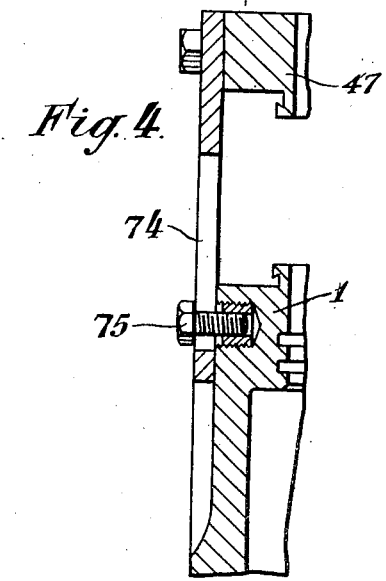

2,559,321

UNITED STATES PATENT OFFICE 2,559,321

CASING HEAD EQUIPMENT

Lewis Mervyn Cecil Seamark, Lyme Regis, England

Application November 24, 1947, Serial No. 787,684
In Great Britain December 3, 1946

3 Claims. (Cl. 286—16)

The invention relates to casing head equipment for bore-holes or wells, of the kind in which there is employed a massive elastic sleeve, through which connected sections of the casing tubes, drill stem or the like, may be inserted and withdrawn, without permitting the escape of oil or gas from the bore-hole or well, and whereby boring may be continued while the bore-hole or well is under pressure.

The invention has among its objects to provide an improved and simplified construction of such a casing head equipment; to render the rubber sleeve readily accessible for repair or replacement; to provide means for indicating and controlling the degree to which the massive elastic sleeve is axially compressed, and to provide for the measurement and control of the piston travel in the axial direction.

According to the invention, the casing head equipment for bore-holes or wells, may comprise a cylindrical casing, a massive elastic sleeve of rubber or of a material having similar physical characteristics mounted within the casing an annular piston surrounding the sleeve and adapted for an axial sliding movement in the casing, and means for applying pressure on the piston to cause the axial compression and consequent inward contraction of the massive elastic sleeve within the casing to engage the casing tube, drill stem or the like.

According to the invention furthermore, the massive elastic sleeve may at the upper end be mounted in a cylindrical supporting member or end ring which may be secured by a bayonet-joint or like connection to the inner peripheral wall of the annular piston and at the lower end may be mounted in a cylindrical supporting member or stop ring which is seated on the inner wall of the massive flanged base part of the casing head equipment and in fixed relation thereto.

According to the invention furthermore, means may be provided such as a series of bolts, extending through an annular flange, secured at the upper end of the annular piston, and engaging in the stationary sleeve or cylinder for retaining the piston and parts thereto in any desired position when the hydraulic pressure is released.

According to the invention moreover, means may be provided for setting the level to which the piston may move in its downward travel in operation, whereby a predetermined amount of contraction of the massive rubber sleeve may be obtained. Such means may comprise adjustable studs passing in screw-threaded engagement through axially aligned holes formed in a ring or collar secured to the annular piston and adapted to contact the top face of the stationary sleeve or cylinder in the downward movement of the annular piston.

According to the invention furthermore, means may be provided for holding the piston and the parts secured thereto in the stationary sleeve or cylinder against well pressure when hydraulic pressure on the piston is released. Such means may comprise a series of studs passing through a ring or collar held in fixed relation to the annular piston and engaging in screw-threaded cavities formed for their reception in the stationary sleeve or cylinder.

According to the invention furthermore, when dismantling the casing head equipment or when removing one or more of the component parts for repair or replacement means may be provided extending between the movable and stationary parts of the equipment which in operation permit movement of the parts adapted to move but when dismantling or removing the parts for repair or replacement are adapted to hold the annular piston and parts secured thereto in any desired position with respect to the stationary parts. Such means may comprise a slotted guide member secured to the annular piston or a part held in fixed relation thereto, and adapted to be locked by means of a set-screw, the shank of which passes through the slot in the guide member and engages in the wall of the stationary part of the casing.

The invention further comprises the features of construction hereinafter described.

The invention is diagrammatically illustrated by way of example in the accompanying drawings in which:

Figure 3 is a half plan view and half action on the line 3—3 of Figure 2, and

Figure 4 is a detail view on an enlarged scale of a guide member forming part of the apparatus according to the invention.

Figure 1:
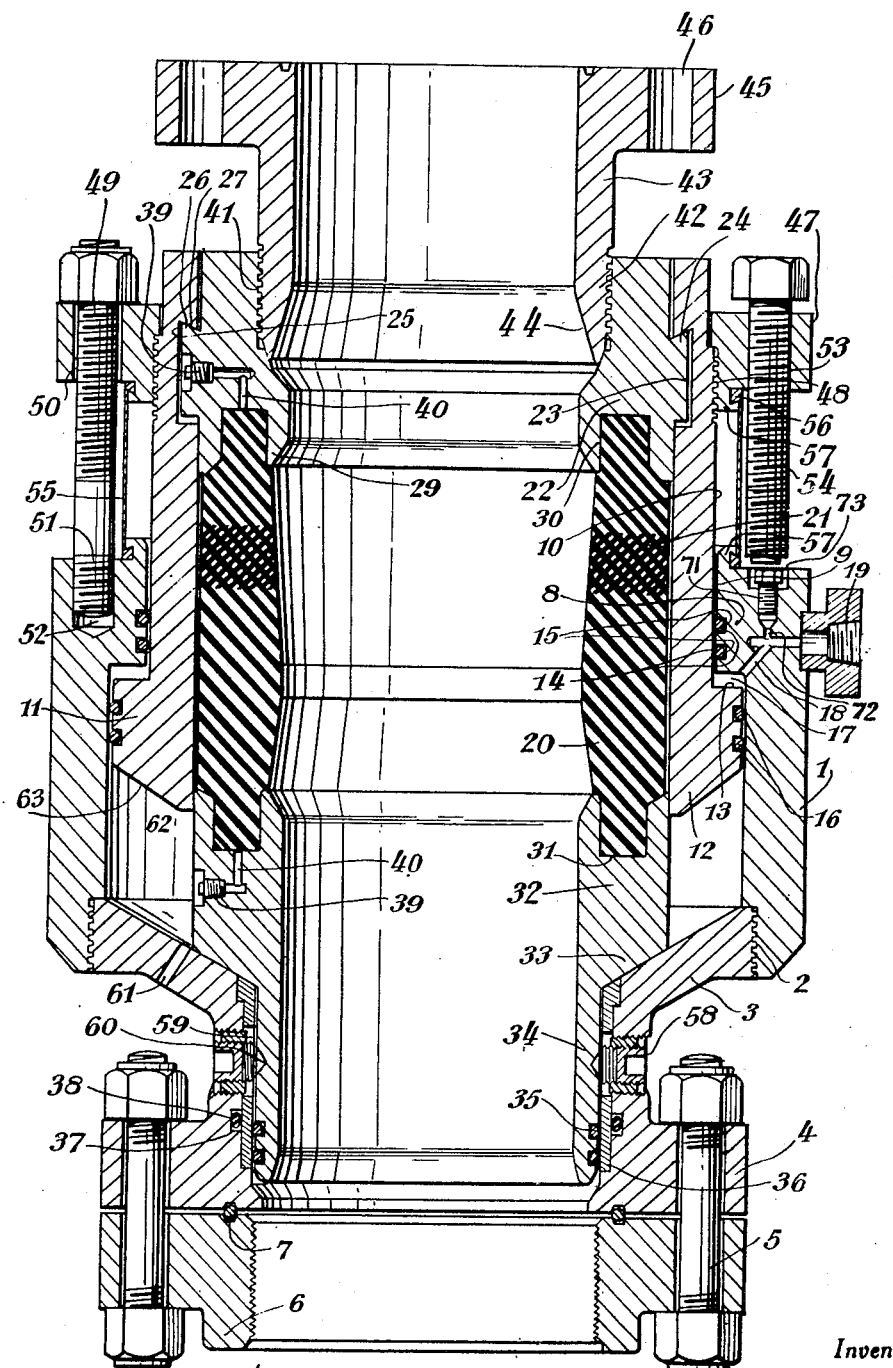
Figure 1 is longitudinal sectional elevation of a blow out preventer according to the invention.

In carrying the invention into effect according to the construction illustrated in the accompanying drawings, a stationary tubular casing 1, in the form of a sleeve or cylinder is internally screw-threaded at 2, for engagement with the correspondingly screw threaded outer periphery of the upwardly directed and outwardly flared flange part 3, of the flanged base part 4, of the casing head equipment, which is itself secured as by studs or bolts 5, in known manner to the well-head flange 6, with sealing rings 7, or other packing interposed between the contacting faces.

The upper end of the stationary sleeve or cylinder 1, is formed with an inwardly extending flange 8, the inner peripheral wall of which at 9, engages with sliding contact the outer peripheral wall 10, of an annular piston 11, formed as a tubular sleeve. The annular piston 11, is provided with a piston head 12, having an outwardly extending flanged part which engages with sliding contact on the inner peripheral wall of the stationary sleeve or cylinder 1. The shoulder 13, formed on the piston head 12, by the outwardly extending flanged part is of sufficient width to stand the stress employed in the application of pressure through the hydraulic accumulator (not shown).

Jointing or sealing rings 14, may be provided in annular cavities 15, formed in the inner peripheral wall of the inwardly extending flange 8, of the sleeve or cylinder 1, and in annular cavities 16, formed in the outer peripheral wall of the piston head 12. An annular space or cavity 17, is thus formed between the under face of the inwardly extending flange 8, of the stationary sleeve or cylinder and the top face of the outwardly extending flanged part or shoulder 13, of the piston head 12.

A channel or channels 18, may be provided bored through the wall of the sleeve or cylinder 1, connecting the annular space or cavity 17 with an inlet passage 19, which is connected to an hydraulic accumulator (not shown), or other suitable source of pressure, so that pressure may be exerted within the annular space or cavity 17, to cause the downward movement of the piston 11, by downward pressure on the top face of the flanged part or shoulder 13, of the piston head 12.

Mounted concentrically within the annular piston, is a massive elastic sleeve 20, advantageously made of rubber or of a material having similar physical characteristics to rubber, and moulded externally to a cylindrical form to lie with the outer peripheral wall flush with the inner peripheral wall of the annular piston 11.

The massive elastic sleeve 20 may be moulded in such a manner as will provide a middle section 21, which may differ in hardness from the two end sections and may vary in internal diameter, advantageously diminishing in diameter from the top edge to a position slightly below the centre line and flaring out gradually towards the bottom edge to a diameter equal to the diameter at the top edge. The inner diameter of the middle section 21, is selected so as to permit the passage of the casing tube, drill stem or the like. Thus the top section may be formed of relatively hard rubber to combat the tendency of the rubber at the upper edge to creep upwardly; the middle section may be made of rubber of relatively medium hardness and the lower section of less hard rubber where the tendency to creep downwardly is retarded by the upward pressure in the well.

The massive elastic sleeve 20 is held at its upper end in an end ring or sleeve member, 22, which is secured at its outer peripheral wall by means of a bayonet-joint connection or the like 23, to the inner peripheral wall of the annular piston 11, at the upper end. Thus the end ring or sleeve member 22, may be provided on its outer periphery with a series of lugs 24, which are adapted to be lowered through spaces provided at corresponding positions in the annular piston member and on rotation of the end ring 22, to be received in cavities 25, formed in the inner peripheral wall of the annular piston 11, the top shoulder 26 of the lugs 24, being formed to slope inwardly so as to be adapted to be held in the cavities 25, in the wall of the piston which at the top 27, are formed of undercut section for the purpose and at the bottom, of square section, the depth of the cavities 25, being greater than that of the lugs 24, to enable the lugs to be held with clearance in the cavities 25, whereby the end rings 22, may be more easily released. The bayonet-joint connection may be secured against rotation when the end ring is in position in the casing by means of a locking plate 28 (Figure 3) or the equivalent. The end ring or sleeve member 22, is provided on the inner face with a downwardly extending rim 29, which forms between its inner face and the inner periphery of the annular piston 11, an annular cavity 30, of channel section, which is adapted to receive the upper part of the massive elastic sleeve 20, which is provided of dimensions to be received with close fit within it.

The massive elastic sleeve 20, is similarly held at the bottom in an annular cavity 31, of channel section provided on the top face of a cylindrical supporting member 32, which is formed on the outer face with a sloping shoulder 33, of conical section to sit on the sloping conical face of the upwardly directed and outwardly flared part of the flanged base part 3, of the casing head equipment.

The cylindrical supporting member 32, is at its lower end extended downwardly to form a sleeve or liner 34, of substantially uniform cross-section and of reduced thickness, which extends to a distance short of the end of the flanged base part.

Sealing rings 35, are provided between the outer peripheral wall of the sleeve or liner 34, and the inner peripheral wall of the flanged base part 4, of the casing head equipment.

A removable hardened steel bush 36, is fitted in the bore of the flanged base part 4, and in a circumferential recess 37, in the bore of the flanged base part 4, a sealing ring 38, is fitted to prevent leakage past the outside of the hardened steel bush 36.

Screwed plugs 39, may be provided respectively in the end ring or sleeve member 22, supporting the massive elastic sleeve 20, at the upper end, and in the cylindrical supporting member or stop ring 32, at the lower end, the plug holes 39, being connected by channels 40, to the annular cavities 30 and 31 in which are held the ends of the massive elastic sleeve 20, so as to permit air to escape when the sleeve is fitted into position in the cavities. The plugs 39 are adapted to be connected to a source of pressure to force the massive elastic sleeve 20, out of the cavities 30 and 31, when the sleeve is to be removed from the supporting rings 22 and 32 for replacement or repair.

The inner peripheral wall of the end ring 22, is screw-threaded at 41, for engagement with the correspondingly screw-threaded lower part 42, of the outer wall of a top flanged sleeve fitting 43, the bore of which is outwardly flared at 44 to be a conical section at the lower end. The flange 45 of the fitting 43, may be axially bored at 46, to permit of connection to another casing head equipment should occasion demand it.

A metal ring or collar 47, with flat end faces is screw-threaded at 48 on the outer peripheral face of the annular piston 11, at the upper end. A number of studs 49, for example four, are provided to extend through clearance holes 50, provided in axial alignment in the ring or collar 47, the studs being adapted for screw-threaded engagement at the lower ends 51, in holes 52, provided in the top face of the stationary sleeve or cylinder 1. The studs 49, serve as a means to prevent the upward movement of the movable parts of the equipment out of the stationary parts under the action of the well pressure should the accumulator pressure not be available.

Provided intermediate the clearance holes 50, in the metal ring or collar 47, are a number of internally screw-threaded holes 53, for example four, for the reception of correspondingly screw-threaded set screws 54, which at their ends bear on the top face of the stationary sleeve or cylinder 1, by which means the extent of travel of the piston 11, may be controlled by the contacting of the heads of the set screws 54, on the top face of the stationary sleeve or cylinder 1.

When, as may sometimes be the case, it is desired to limit the downward travel of the annular piston 11, and so to control the amount of contraction of the inner peripheral wall of the massive elastic sleeve 20, the jacking or set screws 54, may be set so that the downward extent of movement of the piston 11, is determined irrespective of a too great pressure applied from the hydraulic accumulator or other source of pressure.

At the top and bottom edges respectively a skirt of rubber or like material 55, is connected to the metal ring or collar, 47, and the stationary sleeve or cylinder 1, by means of beadings 56, moulded along the top and bottom edges of the skirt 55, to be received in recesses of undercut cross-section in shoulders 57, formed respectively in the head of the stationary sleeve or cylinder 1, and on the underface of the metal ring or collar 47.

The skirt 55, serves to prevent mud and dirt entering between the outer peripheral wall of the annular piston 11, and the inner peripheral surface of the inwardly directed flange 8, of the stationary sleeve or cylinder 1.

The sleeve member or stop ring 32, is held stationary by means of a number of set-screws 58, spaced equidistant and circumferentially in the tubular part of the massive flange or base part 4, of the casing head equipment and extending laterally through screw-threaded bushes 59, to engage with their ends in a recess 60, provided for their reception in that part 34, of reduced thickness in the outer peripheral wall of the sleeve member or stop ring 32.

Figure 2:
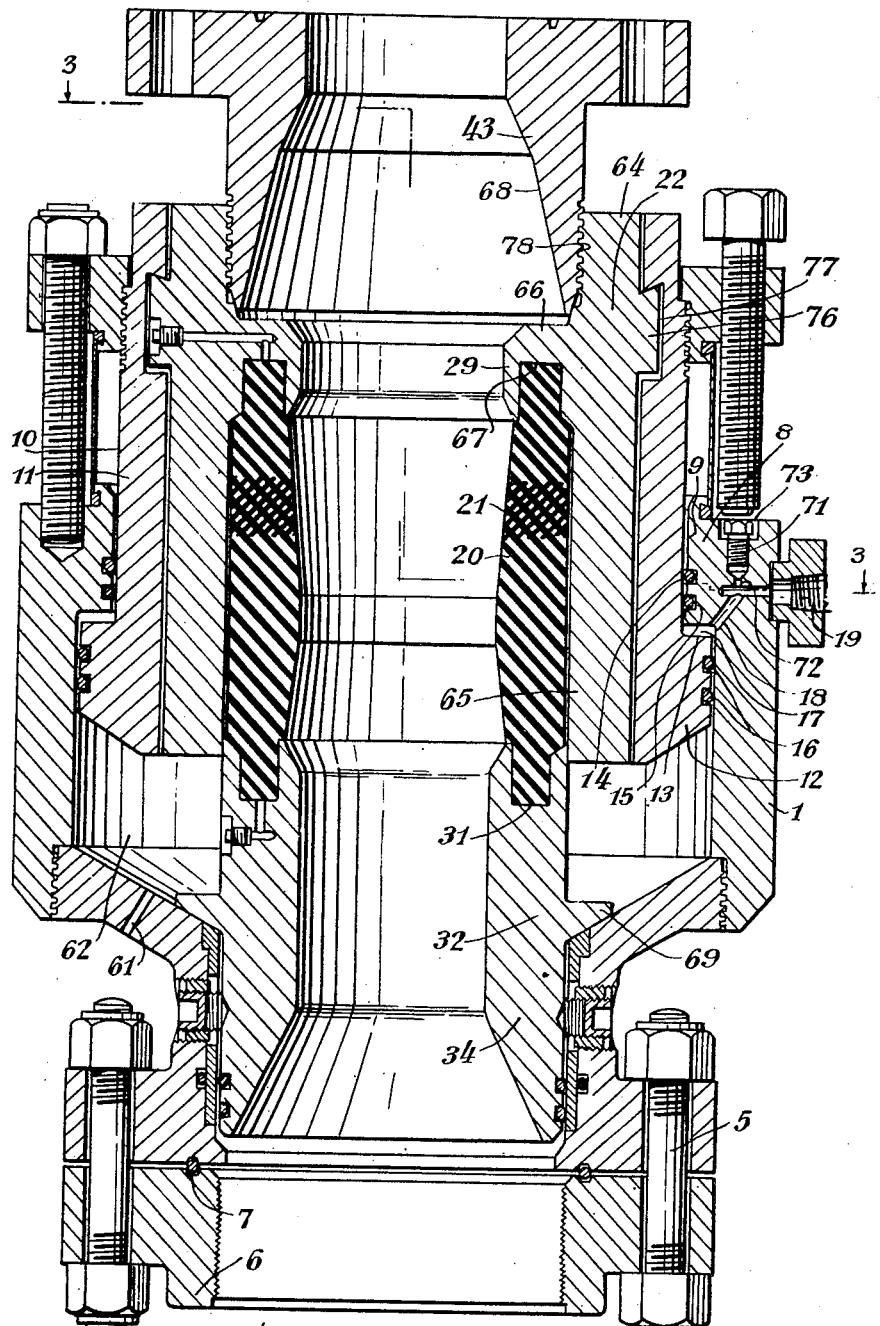
Figure 2 is a corresponding view of a modified construction.

A channel 61, is bored through the outwardly flared part of the flanged base part 3, of the casing head equipment to permit the escape of air in the downward movement of the piston 11, from the annular cavity 62, formed between the inner walls of the stationary sleeve or cylinder 1, the outwardly flared flanged part 3, of the flanged base part 4, the outer walls of the sleeve member or stop ring 32, and the tapered end face 63, of the piston 11.

Where it is desired to use the equipment for a lesser diameter pipe, casing tube, drill stem or the like, as illustrated in Figure 2 of the accompanying drawings, a cylindrical member 64, may be inserted as a liner or bushing between the massive elastic sleeve 20, and the annular piston 11, the lower end of the liner or bushing 64, extending downwardly as a sleeve 65, to encircle the upper end of the sleeve member or stop ring 32. At the upper end the liner or bushing 64, is formed with an inwardly extending flange 66, which is provided on its under face with an annular cavity 67, of channel section to receive the upper end of the massive elastic sleeve 20, which is moulded to such dimensions as to be received with close fit within it. On its outer peripheral wall at the upper end the liner or bushing 64, may be provided with circumferential lugs 76, forming the male members of a bayonet-joint connection, and adapted to be received within the corresponding female members formed as cavities 77, within the inner peripheral wall of the annular piston 11, at the upper end.

At the upper end the liner or bushing 64, is provided on its inner peripheral wall with screw threads 78, for engagement with the outer screw-threaded wall of the top flanged sleeve fitting 43. It will thus be understood that the end ring or sleeve member 22, is dispensed with, being incorporated in the liner or bushing 64.

The top flanged sleeve fitting 43, on its inner periphery is formed, to a distance short of the top face at 68, of decreasing diameter. A number of liners 64, of different thicknesses may be used according to the diameter of the drill pipe, tube stem or the like.

The sleeve member or stop ring 32, where a liner or bushing is used, is provided of a greater thickness than where no liner or bushing is used, and is in such case provided of uniform section for the greater part of its length, the inner peripheral wall being formed to an increasing diameter at the lower end, as shown in Figure 2 of the drawings. It will be understood that where a liner or bushing is used, the outer diameter of the cylindrical sleeve or stop ring will be less, and the upper part seating on the inclined inner face of the upwardly directed flanged part 3, of the massive flange or base part 4, of the casing head equipment will be formed as an annular flange 69.

The massive flange or base-part of the casing head equipment 4 is bolted on to the well-head flange in known manner by studs or bolts 5.

A screw-threaded pin 71, serving as an air bleeder valve is provided to extend into a channel 72, formed in the top face of the flanged head 9, of the stationary sleeve or cylinder 1, the channel 72, communicating with the channel 19 connecting the hydraulic accumulator, or other suitable source of pressure, to the annular space or cavity 17, formed between the top face of the piston head 12, and the under face of the flanged part 9, of the stationary sleeve or cylinder 1, and the head of the pin 71 being received within a recess 73 in the top face of the head of the stationary sleeve or cylinder 1.

To enable the annular piston 11, and movable parts secured thereto to be secured in a raised position when the hydraulic pressure is released, and it is required to remove the massive elastic sleeve 20, and its supporting parts, a slotted guide member 74 may be provided secured to the ring 47, and secured when required by a bolt 75 to the outer peripheral wall of the stationary tubular casing 1. The weight of the piston 11, and connected parts is thus held so that it is possible freely to rotate the end ring 22, and connected parts and thus release the bayonet-joint connections, and withdraw the massive elastic sleeve 20, and its connected parts.

In operation, the pressure applied from an hydraulic accumulator or other suitable means causes the annular piston 11, to move downwardly in the stationary sleeve or cylinder 1, and to compress the massive elastic sleeve 20, between the upper sleeve member or end ring 22, and the lower sleeve member 32, thus closing the annular space between the outside of the drill pipe or the like and the massive elastic sleeve 20.

The downward movement of the sliding piston member 11, may be limited as desired by screw-threaded adjustment of the studs 54, abutting with their ends on the top face of the stationary sleeve or cylinder 1, thus permitting a limited compression of the massive elastic sleeve 20, and if necessary a consequent predetermined amount of contact between the drill, stem or the like and the inner peripheral wall of the massive elastic sleeve.

Thus it will be understood that in the construction of casing head equipment according to the invention, the casing tube, drill stem or the like may be caused to pass without leakage from the wall on insertion or withdrawal through the casing head equipment. Furthermore, where any part of the equipment requires replacement or repair this can be effected quickly and easily; thus the annular piston 11, may be held in a raised position by means of the slotted guide member 74, and the upper sleeve member or end ring 22, together with the massive elastic sleeve 20 and the lower sleeve member or stop ring 32, may be removed together by a rotary movement to release the bayonet-joint connection between the ring 22, and the annular piston 11. The massive elastic sleeve 20, may be removed from the upper and lower supporting members 22 and 32 respectively, by applying pressure through the channels 30 and 31 into the upper and lower cavities respectively in the upper sleeve member or end ring 22, and the lower sleeve member or stop ring 32.

The invention is not limited to the particular details of construction as hereinbefore set forth which may be varied widely to obtain the results set forth.

I claim:

1. Casing head equipment for bore-holes or wells comprising a cylindrical casing, a massive elastic sleeve mounted within the casing and formed of three sections of rubber or of a material having similar characteristics, the rubber in the uppermost section being relatively hard, in the middle sections less hard, and in the lowermost section least hard, an annular piston surrounding the sleeve and adapted for an axial sliding movement in the casing, a cylindrical upper end ring secured to the inner peripheral wall of the annular piston and engaging the massive elastic sleeve at the upper end, a cylindrical lower end ring seated on the inner wall of a massive flanged part of the casing head equipment and engaging the massive elastic sleeve at the lower end, and means for applying fluid pressure continuously on the annular piston to cause the axial compression and consequent inward contraction of the massive elastic sleeve within the casing, to engage the casing tube, drill stem or the like.

2. Casing head equipment for bore-holes or wells, comprising a massive elastic sleeve of rubber or of a material having similar physical characteristics, an annular piston surrounding the sleeve and adapted for an axial sliding movement in the casing, a cylindrical upper end ring secured by a bayonet joint connection to the inner peripheral wall of the annular piston and engaging the massive elastic sleeve at the upper end, a cylindrical lower end ring seated on the inner wall of a massive flanged part of the casing head equipment and engaging the massive elastic sleeve at the lower end, and means for applying fluid pressure continuously on the annular piston to cause the axial compression and consequent inward contraction of the massive elastic sleeve within the casing, to engage the casing tube, drill stem or the like.

3. Casing head equipment for bore-holes or wells, comprising a massive elastic sleeve of rubber or of a material having similar physical characteristics, an annular piston surrounding the sleeve and adapted for an axial sliding movement in the casing, a cylindrical upper end ring secured by a bayonet joint connection to the inner peripheral wall of the annular piston and engaging the massive elastic sleeve at the upper end, means for locking said connection, a cylindrical lower end ring seated on the inner wall of a massive flanged part of the casing head equipment and engaging the massive elastic sleeve at the lower end, and means for applying fluid pressure continuously on the annular piston to cause the axial compression and consequent inward contraction of the massive elastic sleeve within the casing, to engage the casing tube, drill stem or the like.

LEWIS MERVYN CECIL SEAMARK.

REFERENCES CITED

The following references are of record in the file of this patent:

UNITED STATES PATENTS

| Number | Name | Date |
|---|---|---|
| 1,560,763 | Collins | Nov. 10, 1925 |
| 2,148,844 | Stone et al. | Feb. 28, 1939 |
| 2,401,960 | Pranger | June 11, 1946 |

FOREIGN PATENTS

| Number | Country | Date |
|---|---|---|
| 114,504 | Great Britain | of 1918 |